US007228415B2

(12) United States Patent
Eschbach et al.

(10) Patent No.: US 7,228,415 B2
(45) Date of Patent: *Jun. 5, 2007

(54) METHOD AND APPARATUS FOR TRANSFERRING A COMMUNICATION SESSION

(75) Inventors: Jeffrey T. Eschbach, Schaumburg, IL (US); Senaka Balasuriya, Palatine, IL (US); Aaron M. Smith, Streamwood, IL (US); Jie Weng, Carmel, IN (US); Gregory W. Cox, Schaumburg, IL (US)

(73) Assignee: General Instrument Corporation, Horsham, PA (US)

( * ) Notice: Subject to any disclaimer, the term of this patent is extended or adjusted under 35 U.S.C. 154(b) by 823 days.

This patent is subject to a terminal disclaimer.

(21) Appl. No.: 10/002,880

(22) Filed: Nov. 2, 2001

(65) Prior Publication Data

US 2003/0088765 A1    May 8, 2003

(51) Int. Cl.
*H04L 9/00* (2006.01)

(52) U.S. Cl. .......................... 713/162; 380/46; 380/277

(58) Field of Classification Search ................ 713/162; 370/395.2; 379/221.01, 88.21, 212.01, 211.01; 726/3; 380/46, 277; 709/227, 229

See application file for complete search history.

(56) References Cited

U.S. PATENT DOCUMENTS 5,517,618 A * 5/1996 Wada et al. ................ 709/223

(Continued)

FOREIGN PATENT DOCUMENTS

WO        WO0033189    *  6/2000

OTHER PUBLICATIONS

☐☐Handley et al, RFC: 2543-SIP: Session Initiation Protocol, Mar. 1999, Network Working Group, p. 1-153.*

(Continued)

*Primary Examiner*—Kim Vu
*Assistant Examiner*—Linh L D Son
(74) *Attorney, Agent, or Firm*—Larry T. Cullen

(57) ABSTRACT

Session Inter-Device (SID) mobility networks (50, 100, 150) are described in which a seamless transfer of a communication session from a first device (56, 106, 116) to a second device (66, 116, 166) can be achieved without interrupting the active session. According to the SID mobility network (50), the transfer can be accomplished by transferring away from the Transferring Node or first device (56) the IP address associated with the active session (58) so that the network (50) will route the session to the desired Target Node or second device (66). The Transferring Node (56) transfers its IP address (58) to the Agent (60) and stops requesting data packets addressed to its IP address (58). The Agent (60) then begins to request and eventually receive the packets addressed to the Transferring Node's IP address (58). The Agent (60) then transfers the packets to the Target Node (66). In an alternate SID mobility network (100), the Transferring Node (106) transfers a session specific IP address (114) to the Agent (110). The Agent (110) then transfers packets sent to the session specific IP address (114) to the Target Node (120). In another SID mobility network (150), the Transferring Node (162) obtains a temporary IP address (170) and transfers its IP address (164) to a Session Agent (166). The Session Agent (166) begins to request and eventually receive the packets addressed to the Transferring Node's IP address (164), and for each received packet determines if it belongs to the session the Transferring Node (162) requested to transfer to the Target Node (176). If it does, the Session Agent (166) will transfer the packet to the Target Node (176) at the Target Node's IP address (178). If it does not, the Session Agent (166) will transfer the packet to the Transferring Node (162) at its temporary IP address (170). In each SID mobility network, the session with respect to the Correspondent Node continues without interruption throughout the transfer, thereby providing a seamless transfer of the session from a first device to a second device.

27 Claims, 7 Drawing Sheets

U.S. PATENT DOCUMENTS

| | | | |
|---|---|---|---|
| 6,373,946 B1 * | 4/2002 | Johnston | 380/211 |
| 6,377,589 B1 * | 4/2002 | Knight et al. | 370/524 |
| 6,591,364 B1 * | 7/2003 | Patel | 713/170 |
| 6,603,849 B2 * | 8/2003 | Lin et al. | 379/221.01 |
| 6,778,540 B1 * | 8/2004 | Ratcliff et al. | 370/401 |
| 6,876,640 B1 * | 4/2005 | Bertrand et al. | 370/331 |

OTHER PUBLICATIONS

Binh et al, Integrated personal Mobility Architecture: A complete personal mobility solution, The University of New South Wales, Sydney, Australia, p. 1-31.*

* cited by examiner

METHOD AND APPARATUS FOR TRANSFERRING A COMMUNICATION SESSION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

REFERENCE TO A COMPUTER PROGRAM LISTING APPENDIX SUBMITTED ON A COMPACT DISC

The computer program listing appendix contained within file "code_listing.txt" on compact disc "1 of 1", which has been filed with the United States Patent and Trademark Office in duplicate, is hereby incorporated herein by reference. This file was created on May 23, 2001, and is 56 KB in size. The appendix describes an alternate embodiment of the invention discussed below in the Detailed Description of the Preferred Embodiments.

BACKGROUND OF THE INVENTION

This invention relates generally to a method and apparatus for transferring a communication session from a first destination device to a second destination device in a computer network with minimal disruption to the communication session, and more particularly to a method and apparatus for transferring a communication session between a Transferring Node and a Correspondent Node in an Internet Protocol (IP) based network from the Transferring Node to a Target Node without disrupting the communication session with respect to the Correspondent Node.

Over the past decade, the number and size of computer networks, such as the Internet, Intranets, Wide Area Networks (WAN's), and Local Area Networks (LAN's), have increased dramatically. In addition, the number of users who access these networks from various locations over the network has grown. For example, many users are accessing their networks from other office buildings on and off corporate campuses, from their homes, from client offices, etc. The increase in the number and size of networks, as well as the increase in the number of mobile users has introduced several problems including the inability to provide uninterrupted access to the network for Mobile Nodes. One of the main problems confronted has been the inability to allow a user to disconnect from one IP sub-network in a large IP network and reattach to the large IP network from another sub-network without interrupting ongoing network communication sessions. For example, users may be required to manually change IP addresses and reinitialize sessions when they move about the network in order to be recognized as an authorized network user or to access their network files. A solution to this problem was presented in the form of an extension to the Internet Protocol called Mobile IP.

Mobile IP is a recently standardized method for enabling what this description terms Session Inter-Subnet (SIS) mobility in IP networks. SIS mobility refers to the ability of a device to disconnect from an IP network such as the Internet and reattach to the IP network on another sub-network without interrupting ongoing sessions. Mobile IP is documented in Internet Engineering Task Force (IETF) Request For Comment (RFC) 2002, 2005, and 2006. Textbooks such as "Mobile IP: The Internet Unplugged" ISBN 0-13-856246-6 by James D. Solomon also document Mobile IP. Mobile IP is one of the dominant IETF standards in mobility and operates as a highly secure and dynamic packet data device mobility service. It provides a network layer solution for moving active sessions with a device as the device moves between IP sub-networks. Therefore, the user does not have to manually change an IP address and reinitialize sessions when moving around within the IP network, nor do Correspondent Nodes need to take action to maintain communication with Mobile Nodes.

According to Mobile IP, a network connection can be broken down into a Correspondent Node and a Mobile Node connected via an IP network. The Correspondent Node is a node located elsewhere on the IP network that is currently communicating with another node called the Mobile Node. When the Mobile Node is at its home location, in other words directly attached to its home sub-network, it receives communications from the Correspondent Node via routers that direct the communications to a home router, which in turn directs this information to the Mobile Node. During this active communication session, the Mobile Node may wish to move to a different sub-network, called a foreign network, while continuing to maintain the active session throughout the move. In order to do so without disrupting the Correspondent Node and the current communication session, the Mobile Node must continue to be reachable via the IP address it has been using throughout its communication session with the Correspondent Node. This task is accomplished in Mobile IP by use of a Home Agent.

The Home Agent (HA) intercepts communications meant for the Mobile Node and forwards these communications to the Mobile Node wherever it currently is located. The HA accomplishes this by use of a low-level protocol within the Internet Protocol (IP) suite called Address Resolution Protocol (ARP). ARP associates or "binds" the physical address of a node on the local sub-network with its IP address. Multiple IP addresses can be associated in this fashion with a single physical address. By using ARP, the HA associates its physical address with the IP address(es) of the Mobile Node(s). Following this association, the HA will receive traffic (or data) sent from the Correspondent Nodes to the Mobile Node's home address and the Mobile Node will register a "care of" address with the HA identifying its current location. The Mobile Node keeps the HA aware of its current care-of address by sending registration messages to the HA. The HA then forwards communications to the "care-of" address on the foreign network via an IP tunnel. Various types of IP tunnels exist in the art (IETF RFC's 1701, 2003, 2004), but each is essentially used to encapsulate the original communication as an inner IP packet (inner packet) or payload section of another larger IP packet (outer packet) which is addressed from the tunnel starting point to the tunnel endpoint. The tunnel endpoint node removes the outer packet header information, restoring the original packet (or communication).

One possible endpoint for the tunnel carrying forwarded packets for the Mobile Node from the Home Agent is a Foreign Agent (FA). The FA is a router with at least one interface on the Mobile Node's current foreign sub-network. Upon receipt of the tunneled packet, the Foreign Agent can provide a care-of address for the Mobile Node so the packet will be properly delivered. The FA may also de-tunnel packets forwarded by the Home Agent for the Mobile Node by removing the outer packet header, thus restoring the packets back to the packets originally intercepted by the Home Agent. The FA then sends these de-tunneled packets directly to the Mobile Node on its current foreign sub-network via the Mobile Node's link-layer address.

Another possible endpoint for the tunnel from the Home Agent is the Mobile Node itself. In this case, the Mobile node may acquire a temporary IP address on the foreign sub-network. This temporary address, called a co-located care-of address, functions as the care-of address for the Mobile Node while connected to the foreign sub-network. The Mobile Node may acquire this address by any means for generating IP addresses known in the art such as a Dynamic Host Configuration Protocol (DHCP) which is documented in IETF RFC 2131. Using this method of acquiring an address, the Mobile Node contacts a DHCP server requesting an unused IP address on the Mobile Node's current foreign sub-network. DHCP is increasingly common on current IPv4 networks, and future networks employing IPv6 will allow for nodes to dynamically create IP addresses without needing to acquire the addresses from a server. Thus, co-located care-of address generation is an increasingly viable option for receiving tunneled packets from the Home Agent, freeing the Mobile Node from the constraint of only visiting foreign sub-networks that have FA's.

The operation of Mobile IP outlined above was designed to enable a specific type of mobility, but there remain other types of mobility that have not been addressed. Mobile IP partially fills the mobility gap in the IP protocol suite by accommodating device movement between IP network attachment points or sub-networks while maintaining all of the device's IP communication sessions. For example, Mobile IP enables a notebook PC to move from its office Ethernet connection to a wide-area wireless packet data network with all of its network communications sessions with multiple Correspondent Nodes in tact. This Session Inter-Subnet (SIS) mobility has become increasingly common, thereby increasing the need for Mobile IP. However, Mobile IP does not address the problem of moving active communication sessions between different devices. For example, a user may wish to transfer a video conference from a fixed desktop machine to a notebook PC or Personal Digital Assistant (PDA) as the user leaves the office in order to continue participating. This description terms moving active IP networking sessions between devices such as in the above example "Session Inter-Device" (SID) mobility.

Networks other than IP networks provide transfer features and can enable movement of active communication sessions between devices. However, these networks do not address the variety of media and devices present in IP networks. For example, the International Telecommunications Union (ITU) H.323 protocol suite provides for call transfer based on the traditional telephony model and can accommodate transfer of multimedia sessions, and the IETF Session Initiation Protocol (SIP) family (IETF RFC 2543) with proposed extensions (IETF Draft "SIP Call Control Transfer" draft-ietf-sip-cc-transfer-02) provides for call transfer accommodating multimedia sessions as well. However, both of these approaches operate at a level often requiring modification to applications, including applications running on Correspondent Nodes. Furthermore, traditional telephony call transfer methods involve a gap or "hold" in the communication session while the call is redirected.

Thus, there is a need for a system and method capable of providing selective transfer of active communication sessions between nodes on an IP network from one end device to another end device with minimal disruption of the selected and unselected communication sessions.

BRIEF DESCRIPTION OF THE DRAWINGS

Other objects and advantages of the invention will become apparent upon reading the following detailed description of the preferred embodiments and upon reference to the drawings, in which.

DETAILED DESCRIPTION OF THE PREFERRED EMBODIMENTS

In accordance with the present invention, network systems and methods are provided for transferring a communication session from a first destination device to a second destination device with minimal disruption. This transfer, which this description terms Session Inter-Device mobility or SID mobility, can be accomplished by transferring from the Transferring Node (or first destination device) the IP address(es) associated with active session(s) so that the network system will route the session communication(s) with the Correspondent Node(s) to the desired Target Node (or second destination device). The address can be transferred to the Target Node or to an intermediary agent, as will be discussed further hereinafter.

Figure 1A:
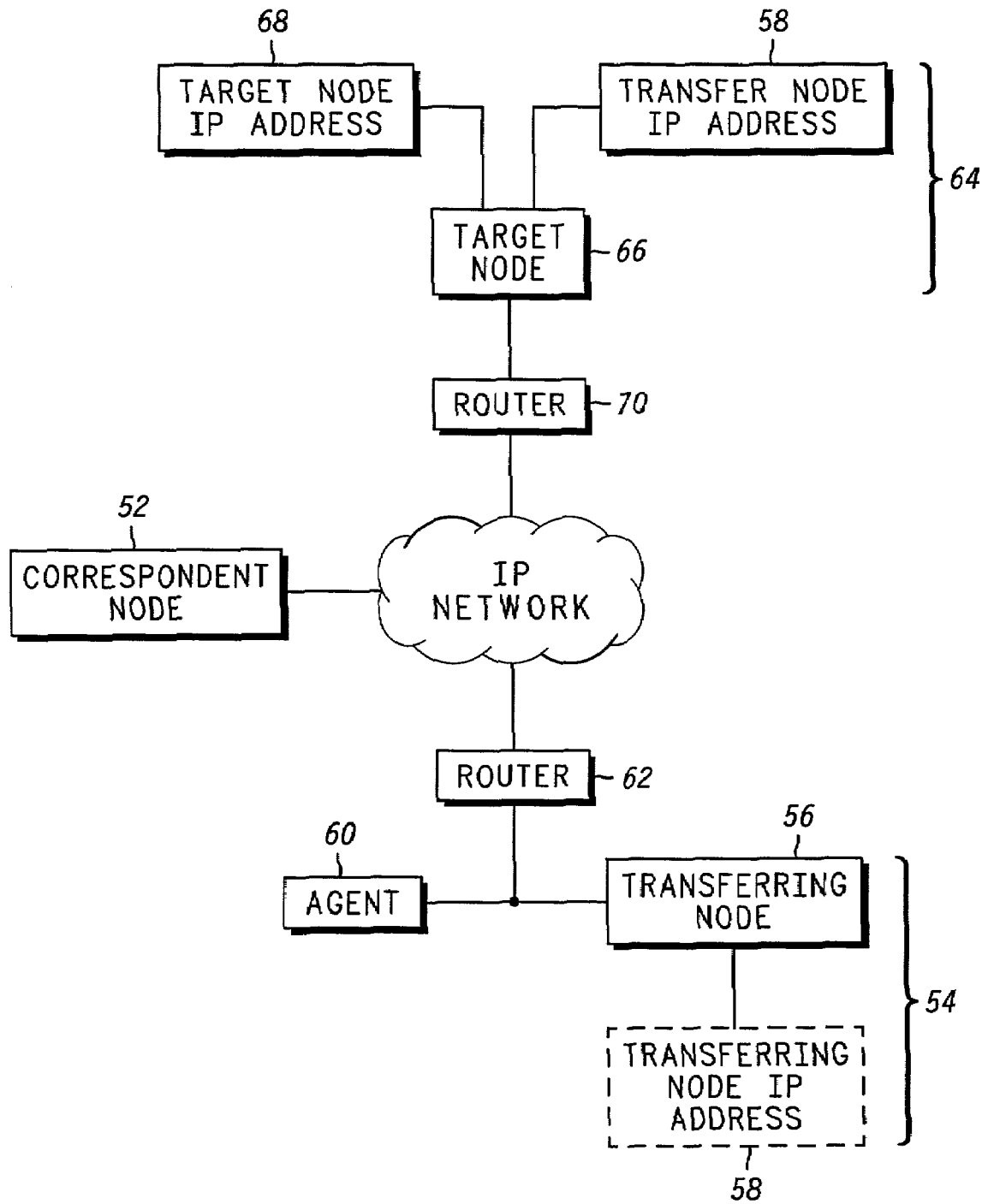
FIG. 1a is a block diagram of an IP based network system showing a communication session between a source device and a first destination device that can be transferred to a second destination device on a different sub-network where all communication sessions intended for the first destination device are transferred to the second destination device.
Figure 1B:
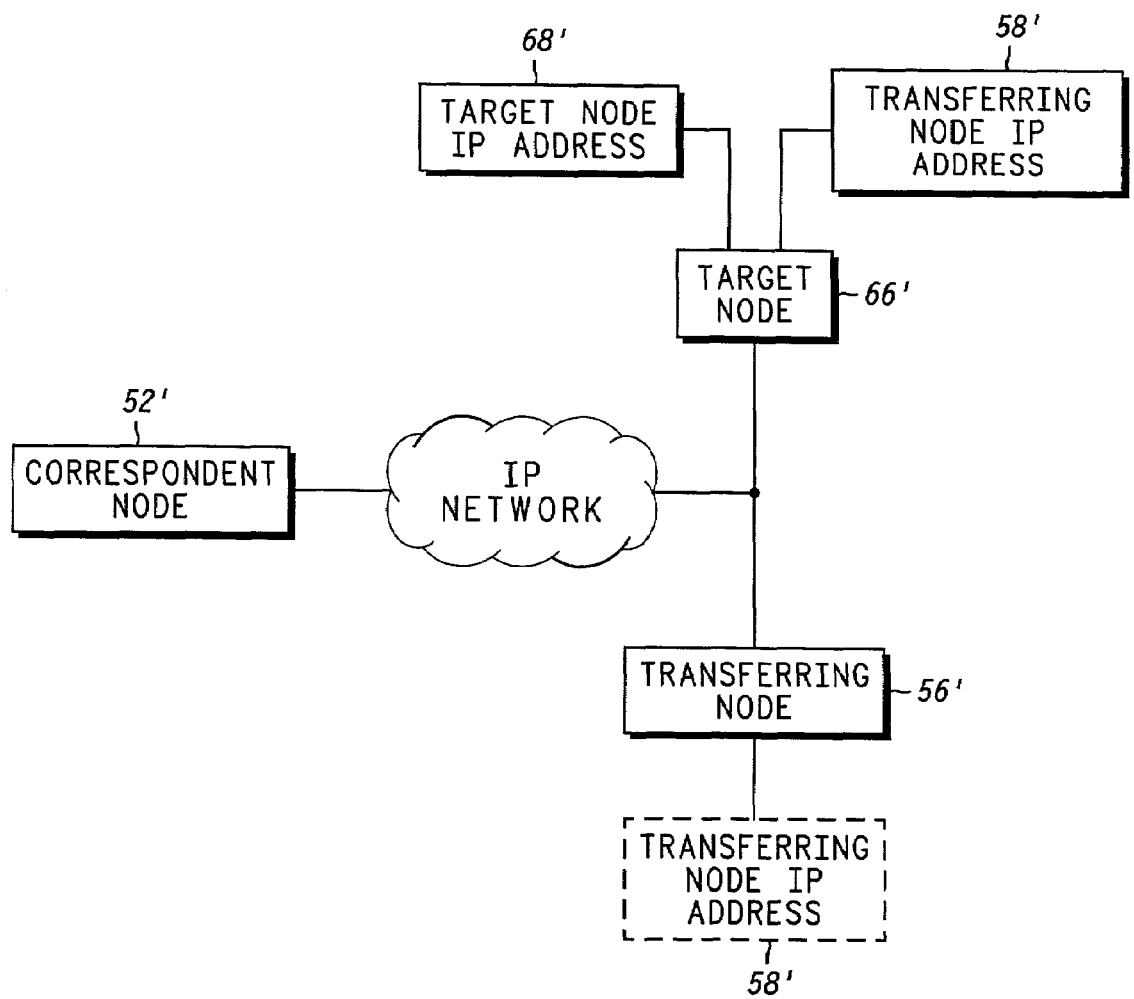
FIG. 1b is a block diagram of the network system of FIG. 1a wherein both the first and second destination devices are on the same sub-network.

According to the SID mobility network system and method of FIGS. 1a and 1b, the Transferring Node participates in a communication session with a Correspondent Node using its IP address as the destination for communication with the Correspondent Node. When a decision is made to transfer the session from the Transferring Node to a Target Node, the Transferring Node transfers its IP address to the Target Node and stops receiving data packets addressed to its transferred IP address. The Target Node then requests and receives packets addressed to the transferred IP address of the Transferring Node. While the transfer is taking place and after it has been completed, the session with respect to the Correspondent Node continues without interruption.

In network systems where it is desired for the Transferring Node to retain the connectivity or capability of participating in additional sessions (e.g., ability to communicate with other Correspondent Nodes), an alternate form of a SID mobility network system is provided (FIGS. 2a–b) in which a separate session specific IP address is used for each communication session. Once it has been determined that a Transferring Node and a Correspondent Node want to participate in a session together, the Transferring Node obtains a session specific IP address such as from an address generator. The Correspondent Node is then made aware of the session specific IP address of the Transferring Node and a session is initiated between the Correspondent Node and the Transferring Node using the session specific IP address. When a decision has been made to transfer the session from the Transferring Node to a Target Node, the session specific IP address is transferred to the Target Node and the Transferring Node stops receiving packets addressed to the session specific IP address while the Target Node begins receiving packets addressed to the session specific IP address. While the transfer is taking place and after it has been completed, the session with respect to the Correspondent Node continues without interruption. In addition, the Transferring Node can participate in sessions with additional Correspondent Nodes, each session using its own session specific IP address.

In networks requiring efficient use of network addresses (e.g., networks with limited numbers of addresses or networks where addresses are expensive), an alternate SID mobility network system is provided (FIGS. 3a–b) wherein a single temporary IP address per Transferring Node is required to transfer a plurality of selected active sessions from a Transferring Node to a plurality of Target Nodes. When a decision has been made to transfer a session from the Transferring Node to a Target Node, the Transferring Node gains a temporary IP address while its original IP address is transferred to a Session Agent. The packets for the transferred session are no longer received by the Transferring Node but are instead tunneled by the Session Agent to the IP address of the Target Node while all of the other session packets are tunneled to the temporary IP address of the Transferring Node. The Session Agent accomplishes the forwarding of packets by receiving all packets for the original IP address of the Transferring Node and sorting them based on session specific information before tunneling them to different destination devices. This allows the Transferring Node using its temporary IP address to continue its participation in existing sessions, allows the Transferring Node to create new sessions, and allows the Target Node to receive packets for transferred sessions. While the transfer is taking place and after it has been completed, the sessions with respect to the Correspondent Nodes continue with minimal interruption.

Several instances exist in which the ability to transfer a session from a Transferring Node to a Target Node with minimal interruption would be advantageous. For example, a need exists for a SID mobility network system enabling a network system user the ability to transfer a video call from a desktop personal computer (PC) to another device, such as a laptop PC, a video equipped personal digital assistant (PDA), or a handheld videophone. This would enable the network system user the ability to participate in a video call while it is moved from a Transferring Node to a Target Node.

One example of when such movement could become necessary is if the network system user was participating in the video call on a battery-powered device running low on battery power. The network system user could transfer to a line-powered device in order to conserve battery power and possibly improve the quality of service.

In another example, a customer service representative on one networked device may want to forward the active communication session to a customer service technician on another device without losing the information the customer service representative has gathered thus far, (e.g., an order which was placed for the customer, the customer's name, product serial number, credit card number, etc.). Later the technician may transfer the session including the call and the database information to another technician for additional help, avoiding the need to ask the customer for this information again.

In yet another example, a video monitoring system may be installed at a hospital to monitor current patient conditions so that immediate diagnosis may be provided from a doctor if needed. For example, if an emergency situation occurred, the video session could be transferred to the nearest networked device to the doctor's current location so diagnosis and treatment could be made immediately. Other possible usage scenarios involve interactive and team based gaming, job sharing, and medical patient monitoring. The above examples require application state information transfer that will not be discussed wherein. In general, a SID mobility network system is most useful to a user requiring the need to transfer a session from a Transferring Node (or first destination device) to a Target Node (or second destination device) without establishing a new session and requiring minimal interruption of provided services.

The forms of the SID mobility network systems and methods of operation enable SID mobility in IP-based networks, thereby enhancing the capabilities of any IP-based product. Within the IP protocol suite, a "flow" can be defined as a sequence of packets having a common addressing 5-tuple consisting of the following: source IP address, source port number, destination IP addresses, destination port number, and transport layer protocol (e.g. TCP or UDP). A "session" is a communication involving one or more flows between the same two devices and related to the same application. For example, a video call session may consist of separate flows in both directions (from sender to receiver and vice versa) for audio and video information. One possibility for transferring a session from a first destination device (Transferring Node) to a second destination device (Target Node) is to change the 5-tuple of each pertinent flow to reflect a port and address for the Target Node instead of the Transferring Node. The IP protocol suite, however, assume the 5-tuple remains constant throughout the duration of the session. Therefore, there is no mechanism for changing the 5-tuple in the IP protocol suite without interrupting the flow. It may be possible to modify the IP protocol suite to allow such a change, however, such modifications would be extensive and difficult to deploy in legacy systems. A brief overview of the previously mentioned Mobile IP standard is given in the next paragraph for the purpose of contrasting the described embodiments and is followed by an overview and then a more detailed description of the preferred embodiments.

Figure 1C:
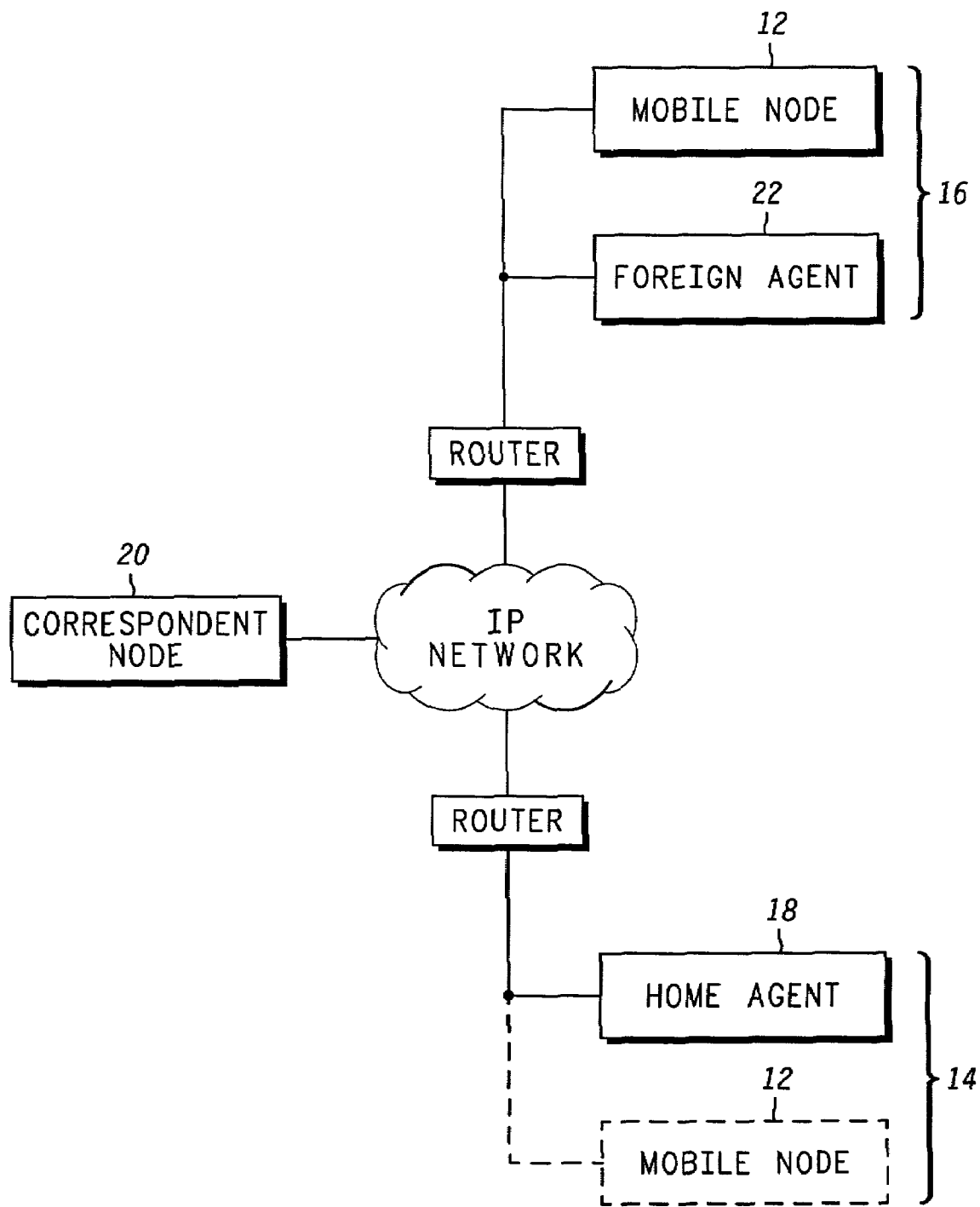
FIG. 1c is a block diagram of a Mobile IP based network system that allows a single destination device to maintain active sessions without interruption despite relocation within the network system.

In FIG. 1c, a block diagram of a Mobile IP network system is shown generally at reference numeral 10. The Mobile IP network system 10 allows a single mobile device 12 to move from its home subnet 14 to a foreign subnet 16 while continuing to receive data sent to its home address.

This is accomplished in-part by having a Home Agent (HA) 18 on the home subnet 14 intercept the IP packets (or communications) addressed to the mobile device 12 from a corresponding device (or Correspondent Node) 20. The HA 18 tunnels the communications to the device 12 (now on the foreign subnet 16) using a "care-of" address, which the device has obtained and registered with the HA 18. The "care-of" address may be a foreign agent care-of address, which is obtained from a Foreign Agent (FA) 22 on the foreign subnet 16, or a co-located care-of address, which is obtained using some other means, (e.g., via a DHCP server). This scheme, however, creates the possibility of denial-of-service attacks where a foreign device on a foreign subnet registers with the HA 18, posing as the mobile device 12 from the home subnet 14 which has moved, thereby stealing packets or communications intended for the mobile device 12. Mobile IP includes security measures in an attempt to prevent this type of attack. In particular, the HA 18 only accepts registration requests from a mobile device 12 which the HA 18 can authenticate as originating from a legitimately relocated mobile device 12. This authentication is accomplished using a security association between the HA 18 and the mobile device 12 based on secret key encryption.

The Mobile IP network operation of having a HA 18 intercept packets sent to a device 12 whose home location is on the HA's subnet 14 and tunneling them to that device 12 when it has relocated on a foreign subnet 16, (discussed above regarding FIG. 1c), can be reused to help enable SID mobility. However, in order to achieve SID mobility, the underlying Mobile IP concept of only transferring the communications to the actual mobile device 12 located on the foreign subnet 16 must be changed so that the receiving device on the foreign subnet (second destination device, or Target Node) can in fact be different than the device on the home subnet (first destination device, or Transferring Node) to which the packets were addressed. In doing so, any open (or selected) communication sessions with the Transferring Node will be transferred to the Target Node, thus enabling the network user to transfer a session from a first destination device to a second destination device with minimal interruption, (i.e. SID mobility). In one sense, this approach can be viewed as legitimizing the denial-of-service attack described above, but only by a Target Node which is implicitly trusted by the Transferring Node. If the Target Node were not trusted, then the HA would not forward the session. In order to accomplish this, a new method is required for establishing a security association between the Target Node and the HA so that the Target Node can register with the HA as though it were actually the relocated home device (i.e. Transferring Node).

Turning now to FIG. 1a, in which a SID mobility IP network system is shown generally designated with reference numeral 50. The network 50 includes a Correspondent Node (or device) 52, a home subnet 54 comprising a Transferring Node (or first destination device) 56 having a Transferring Node IP address 58 and a Agent 60, a home IP router 62, a foreign subnet 64 including a Target Node (or second destination device) 66 having a Target Node IP address 68, and a foreign IP router 70. As will be discussed in further detail below, a method is provided for enabling SID mobility in the network 50 which incorporates leveraging mobile IP functionally as discussed above and establishing a security association between the Agent 60 and the Target Node 66. To ensure the security of the network 50, the security association between the Agent 60 and the Target Node 66 is time limited to the duration of the transferred session so that the Target Node 66 cannot re-register with the Agent 60 at some later time to transfer the Transferring Node's fixture sessions without permission. Also, there is means of terminating the session transfer when the session has ended, or when the Transferring Node 56 wants to cancel the session transfer.

According to the network 50 of FIG. 1a, a session is initiated between the corresponding node 52 and the Transferring Node 56 using the normal IP suite of operations. When the Transferring Node 56 determines that it would like to transfer the session, it negotiates the session transfer with the Target Node 66. Either the Transferring Node 56 or the Target Node 66 may initiate the negotiation. During the negotiation, a session key must be established that will form the basis of a temporary security association between the Target Node 66 and the Agent 60 for the duration of the session transfer. For example, a random number is selected by one of the nodes 56/66 to serve as a session key and is sent to the other node 66/56 in encrypted form using an existing Transferring Node 56/Target Node 66 security association. The session key is transferred in encrypted form to prevent an unauthorized node from intercepting the session key. An existing Transferring Node 56/Target Node 66 security association is required to encrypt the session key and may be accomplished by using a shared secret key, if one exists, or by using a public key encryption. If there is no shared secret key and neither device knows the other's public key, then one device will have to first learn the other's public key from a trusted third party such as a certificate authority. The learning of the public key would only have to be done once, (e.g., before the first time that the Transferring Node 56 transfers a session to the Target Node 66) in order for these devices to transmit sessions between one another. In practice, it will often be the case that the Transferring Node 56 and Target Node 66 are either owned by the same user or under control of the same administration authority, in which case a Transferring Node 56/Target Node 66 security association may be readily available.

During the negotiation, the Transferring Node 56 will also inform the Target Node 66 of the Agent's IP address, and whether the Target Node 66 has permission to use the services of the Agent 60 to further transfer the session to another device. Next, the Transferring Node 56 will request the Agent 60 to transfer the session to the Target Node 66. This request will contain the Transferring Node's IP and link layer addresses, the Target Node's IP address, the session key encrypted using a Transferring Node 56/Agent 60 security association based on a shared secret key or public key encryption, (similar to that described above), and an indication of whether further transferring, (e.g. from the Target Node 66 to another device), is permitted. The Agent 60 authenticates that the Transferring Node 56 is the source of this request using the Transferring Node 56/Agent 60 security association.

After receiving and authenticating the request, the Agent 60 will internally set up a binding (or transfer agreement), which associates the Transferring Node's IP Address 58 with the Target Node's IP Address 68. This binding will be valid for a finite lifetime, after which it will expire. The initial value of this lifetime may be determined in one of several ways. For example, it may be negotiated between the Transferring Node 56 and the Agent 60 as part of the registration process, subject to a maximum value configured in the Agent 60. Alternatively, it may set to an initial default value configured in the Agent 60.

At this point, the Transferring Node 56 stops looking for its IP address 58 on its subnet, (e.g., stops using Address Resolution Protocol (ARP) to cause other nodes on its subnet including the home IP router 62 to associate its IP address 58 with its link layer address), and the Agent 60 begins sending out requests for the Transferring Node's IP address 58, (e.g. using ARP to cause other nodes on its subnet to associate its link layer address with the Transferring Node's IP address 58). As a result of the Transferring Node 56 and Agent 60 ARP behavior, the Agent 60 then begins intercepting data packets sent to the Transferring Node's IP address 58. Using encapsulation methods well known in the art, the Agent 60 then tunnels these packets to the Target Node's IP address 68. For each tunneled packet, the starting point of the tunnel is the Agent 60 and the ending point of the tunnel is the Target Node 66. All IP traffic (or data packets) addressed to the Transferring Node's IP address 58, (including the Correspondent Node 52/Transferring Node 56 session traffic), is thus transferred to the Target Node 66. Therefore, the session transfer is accomplished without interrupting the session or otherwise affecting the Correspondent Node 52.

The Agent 60 will continue to intercept data packets sent to the Transferring Node's IP address 58 and tunnel them to the Target Node's IP address 68 until the internal binding associating these two IP addresses as described above expires. At any point prior to the binding expiration, the Target Node 66 may send a registration request message to the Agent 60 to request that the binding lifetime be extended. The Agent 60 will then extend the lifetime and send a registration reply message to the Target Node 66 to inform it of the new lifetime value. This process may be repeated as needed to prevent the binding from expiring. The session key described above is used as the basis of a Agent 60/Target Node 66 security association which is used to encrypt and authenticate the registration request and reply messages. This use of the security association is needed to prevent unauthorized nodes from spoofing and/or tampering with the registration request and reply messages to adversely affect the lifetime value and thus interfere with the session transfer. While the binding is valid, the session key may also be used for any other Agent 60/Target Node 66 security needs.

When the Correspondent Node 52/Transferring Node 56 session has ended, the Target Node 66 terminates the session transfer by sending a registration request to Agent 60 requesting that the binding lifetime be extended by 0, which the Agent will react to by immediately causing the binding to expire. Alternatively, the Target Node 66 may simply stop sending registration requests to the Agent 60 and let the binding expire at the end of its current lifetime.

When the binding expires, the Agent 60 sends a wake-up message to the Transferring Node 56 using the Transferring Node's IP and link layer addresses and stops intercepting packets addressed to the Transferring Node's IP address, (e.g. stops using ARP to associate its link layer address with the Transferring Node's IP address 58). After receiving the wake-up message, the Transferring Node 56 begins looking for communications addressed to its IP address, e.g. uses ARP to associate its link layer address with its IP address 58 and resumes its normal network connectivity.

Unfortunately, this termination scheme is subject to two potential problems. First, the Target Node 56 may maliciously continue to send registration requests to the Agent 60 extending the lifetime of the binding, thus allowing the Target Node 56 to keep receiving packets sent to the Transferring Node's IP address 58 longer than it should. Note however, it is unlikely that such an abuse will occur given that the Transferring Node 56 must have a high level of trust in the Target Node 66 prior to even allowing the transfer to take place. Therefore, it would seem that the chances of the Target Node 66 doing such a thing is unlikely if the Transferring Node 56 has transferred the session to the Target Node 66. The second potential problem is that the Transferring Node's link layer address may have changed during the period of time that the session was being transferred. If such were the case, the Transferring Node 56 would not receive the wake-up message from Agent 60.

To alleviate these problems, a new message is defined whereby the Transferring Node 56 may demand that the Agent 60 stop the session transfer. Upon receiving this message, the Agent 60 will cause the binding to expire, stop intercepting the communications addressed to the Transferring Node's IP address 58, and stop tunneling packets to the Target Node 66. The Transferring Node 56 may send this message at any time for a variety of reasons, including: (1) when the Transferring Node 56 suspects that the session has ended but that the Target Node 66 is not letting the binding expire; (2) when the Transferring Node 56 has changed link layer addresses and wishes to resume connectivity; (3) when the Transferring Node 56 wishes to override the session transfer and resume connectivity regardless of whether the session has ended or whether the Transferring Node's link layer address has changed; and (4) when the Transferring Node might have been off-line when the wake-up message was sent from Agent 60.

Returning traffic from the transferred session can be sent directly from the Target Node 66 to the Correspondent Node 52 using the Transferring Node's IP address 58 as the source address in the packet header. This approach will not function properly if routers along the Target Node 66 to Correspondent Node 52 path, e.g. the foreign IP router 70, use a process known in the art as ingress filtering to reject packets with a topologically inconsistent source IP address. Alternately, the returning traffic could be reverse tunneled to the Agent 60 for transmission from the Agent 60 to the Correspondent Node 52. Again, this is done using the Transferring Node's IP address 58 as the source address in the packet header. These issues of handling the reverse path from Target Node 66 to Correspondent Node 52 are analogous to issues for Mobile IP (see FIG. 1c) when the Mobile Node 12 visits a foreign network 16 and requires a path from the foreign network 16 to the Correspondent Node 20. Thus, the reverse path issues and solutions are well known and discussed in the art, especially in Mobile IP references already given.

Once the session has been transferred to the Target Node 66, it may be possible for the Target Node 66 to further transfer the session to another device, (e.g., a second Target Node) using the services of the Agent 60. This type of transfer can occur if the Transferring Node 56 has granted permission for the Target Node 66 to do so. The granting of permission may be determined by looking to see if a flag has been set or enabled during the negotiation process between the Transferring Node 56 and the Target Node 66 (which takes place prior to the session transfer starting). If the Target Node has been given the authority to transfer the session, the transfer will be accomplished in a similar fashion to the initial transfer from the Transferring Node 56 to the Target Node 66, (e.g., the Target Node 56 negotiates with the second Target Node, including the selection of a new session key for this transfer and negotiating whether further transfer permission is granted to the second Target Node; and the Target Node 66 communicates the necessary information to Agent 60; the Agent 60 sets up a new binding for this transfer, etc.). When the session is ended, the relevant binding expires and the Agent 60 sends a wake-up message to Transferring Node 56.

Thus far, the discussion has focused on the case where a first destination device transfers a session to a second destination device located on a different subnet. It is also possible, however, that the Target Node (which the session is transferred to) may be located on the same subnet as the Transferring Node. Referring now to FIG. 1b, a session would be initiated between the Correspondent Node 52' and the Transferring Node 56' using the normal IP suite of operations. The Transferring Node 56' and the Target Node 66' would negotiate the session transfer, (again, either may initiate the negotiation), and the Target Node 66' would be informed of the Transferring Node's IP address 58' and link layer address. At this point, the Transferring Node would stop looking for communications addressed to its IP address 58' on the subnet, (e.g., the Transferring Node stops using ARP to associate its link layer address with its IP address 58'), and the Target Node 66' would begin looking for and requesting the communications addressed to the Transferring Node's IP address 58', (e.g. the Target Node starts using ARP to associate its link layer address with its IP address 58'). The Target Node 66' then assumes the Transferring Node's IP address 58' and begins receiving all IP traffic addressed to the Transferring Node 56', including the Correspondent Node 52'/Transferring Node 56' session traffic. It should be appreciated that the session transfer in such a network may be accomplished without an Agent and without interrupting the Correspondent Node 52'/Transferring Node 56' session.

When the Correspondent Node 52'/Transferring Node 56' session has ended, the Target Node 66' sends a wake-up message to the Transferring Node 56' using the Transferring Node's IP and link layer addresses and stops requesting the communications addressed to the Transferring Node's IP address 58', (e.g., stops using ARP). After receiving the wake-up message, the Transferring Node 56' begins requesting the communications addressed to its IP address 58' and resumes its normal role in the network. Alternatively, the Transferring Node 56' may send the Target Node 66' a message at any time demanding to stop the session transfer, and then resuming its role in requesting communications addressed to its IP address 58'.

The transmission of the wake-up message requires the transmitting device (Agent 60 in the different subnet case, and the Target Node 66' in the same subnet case) to create a packet with the Transferring Node's IP address as the destination and to send this packet over the subnet to the Transferring Node using the Transferring Node's link layer address. Normally, a transmitting device determines the link layer address to be used for a given destination IP address by consulting its ARP table. However, this may not work for the wake-up message because, at this point in time, the transmitting device's link layer address will be associated with the Transferring Node's IP address in its ARP table. Thus the transmitting device may bypass the normal ARP table lookup procedure when creating the wake-up message and explicitly plug in the Transferring Node's link layer address, which it has previously stored for this purpose. Requiring this bypass in either the Agent or the Target Node may be undesirable. To avoid this, an alternative wake-up procedure could be used wherein the Transferring Node obtains and requests (e.g., via DHCP) for an interim IP address prior to the session transfer. The Transferring Node would then send the interim address in lieu of its link layer address during the session transfer setup. The interim IP address could be used as the destination for the wake-up message. In this case, the normal ARP table lookup procedure would associate the Transferring Node's link layer address with the interim address, and the Transferring Node would then receive the wake-up message. After receiving the wake-up message, the Transferring Node could then return the interim address, (although it is also possible for the Transferring Node to use the interim address for other connectivity). The use of an interim address avoids the need to bypass the normal ARP table lookup procedure when creating a wake-up message, and it avoids the problem of the Transferring Node not receiving the wake-up message due to its link layer address having changed during the session transfer. However, this method obviously consumes an additional IP address for at least the duration of the session transfer and may therefore not be desirable.

Another possibility for enabling SID mobility is to allow the Target Node to use the same address and the same set of ports that the Transferring Node is using for a session, so that packets pertaining to the session are seen by both devices. In such a case, the user could participate in the session using whichever device he or she chooses, and is free to switch devices without interrupting the session. However, IP routing protocols use the destination IP address to determine routes for transmitting packets through the network to the destination device. With the exception of some special cases, (e.g., broadcasting links where packets sent to any device on the link are visible to all devices on the link, and IP multicasting), there is no support for routing packets to multiple devices sharing an address. In the first special case, devices are required to be on the same broadcast link. In the second special case, the need for SID mobility must be anticipated prior to the beginning of the session so that the session may be initiated as a multicast session. In both cases, reliable communication to multiple devices is not supported, as there is no mechanism for handling acknowledgments from multiple devices for the same session.

When the Transferring Node transfers a session to the Target Node, all of the Transferring Node's IP traffic is transferred to the Target Node. This is convenient when a session has multiple flows, as all of the flows are transferred together. However, if the Transferring Node simultaneously has other active sessions, they will also be transferred. For simple devices that only have one active session at a time, such as a wireless videophone, this may not be an issue. However, for more complex services, a method and apparatus supporting a plurality of IP addresses at the first destination device whereby a unique IP address from the plurality of IP addresses is assigned to a unique transferable session may be desirable. Such a system is depicted in FIG. 2a and FIG. 2b.

Figure 2A:
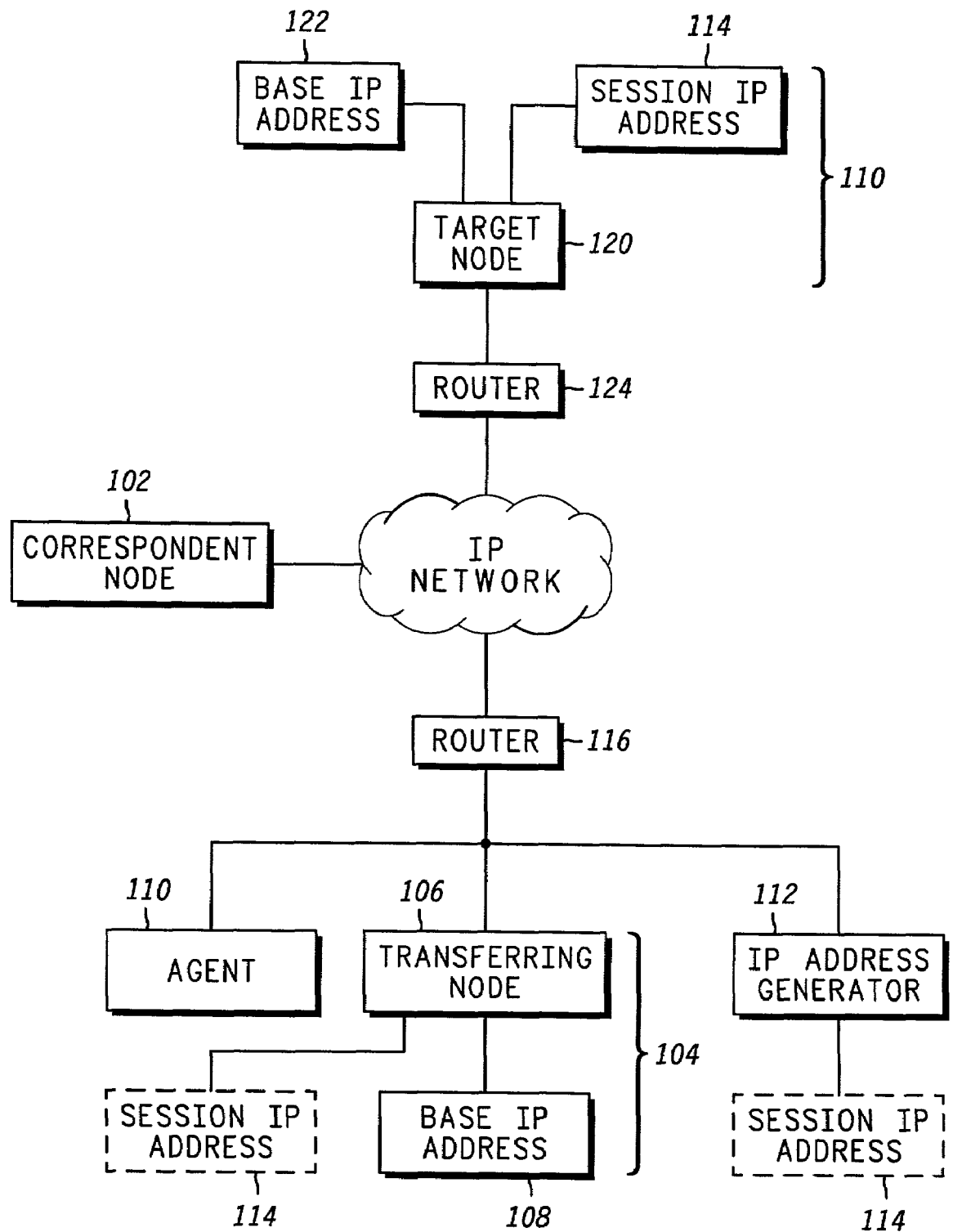
FIG. 2a is a block diagram of an IP based network system showing a communication session between a source device and a first destination device that can be transferred to a second destination device on a different sub-network whereby the session(s) associated with an IP address of the first destination device are transferred to the second destination device.
Figure 2B:
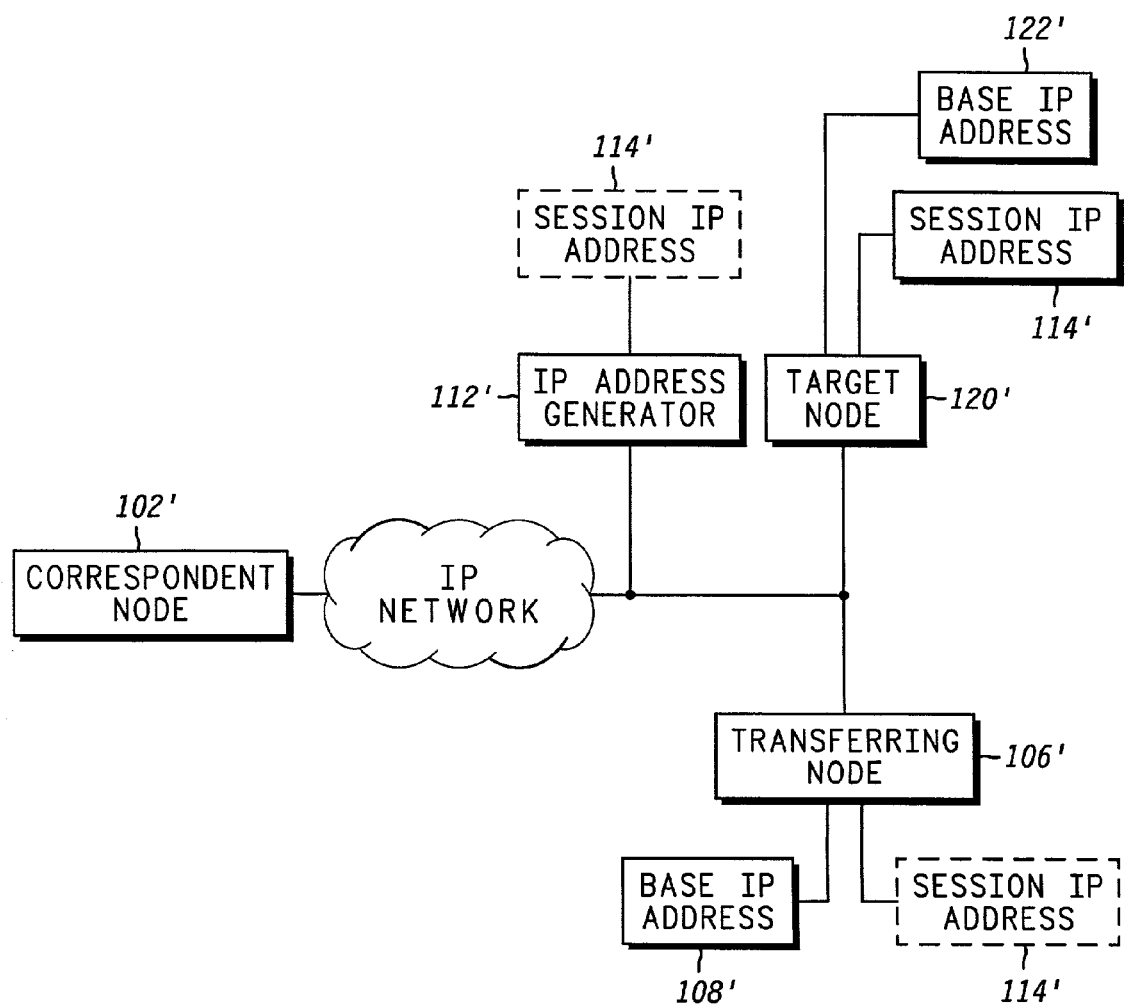
FIG. 2b is a block diagram of the network system from FIG. 2a wherein both the first and second devices are on the same sub-network.

A SID mobility IP network system and method are shown in FIG. 2a and FIG. 2b, wherein a different IP address is used for each transferable session. In FIG. 2a, a SID mobility network and method are shown generally designated with reference numeral 100. In this network system 100, a session specific IP address 114 is obtained for each session and the Transferring Node 106 retains its base IP address 108 so that it may continue to establish and participate in other active sessions. In other words, by using a different IP address for each session, additional active sessions that the Transferring Node does not transfer may remain with the Transferring Node rather than being transferred as would happen in the SID mobility network system as described by FIG. 1a and FIG. 1b. Furthermore, the base IP address 108 provides an initial contact address for a Correspondent Node(s) to establish new sessions that will use session specific addresses. With such a SID mobility network system and method, a seamless transfer of a communication session at the network layer can occur in which the session transfer remains transparent to the corresponding node, which continues to send all packets (or communications) to the session specific IP address.

The network system 100 includes a Correspondent Node 102 and a home subnet 104 including a Transferring Node 106. The Transferring Node 106 has a permanent Transferring Node IP address (or base Transferring Node IP address) 108 which the Correspondent Node designates as the destination address when it wishes to initiate a communication session with the Transferring Node 106. The network system also includes a Agent 110, an IP address generator 112, (e.g., a DHCP server, etc.), capable of generating a session specific IP address 114, and a home IP router 116. The home IP router 116 is used to route data about the network, including packets belonging to the Correspondent Node 102/Transferring Node 106 sessions. As will be discussed in further detail below, the Transferring Node 106 will obtain a session specific IP address from the address generator when a communication session is desired to take place between the Correspondent Node 102 and the Transferring Node 106. With the advent of technologies such as DHCP servers that can allocate IP addresses dynamically to clients, obtaining a session specific IP address can be achieved and operated effectively by allowing the allocated IP addresses to be returned to the DHCP server when the lease time (or check out time) has expired, and reused by the server. In addition to DHCP, other methods for generating and reusing session specific addresses are possible, including the assignment of multiple IP addresses to each Transferring Node specifically for use as session specific addresses. Alternatively, in networks employing IPv6, each destination device can dynamically create IP addresses.

The SID mobility network system 100 further includes a foreign subnet 118 including a Target Node 120 having a Target Node IP address (or base Target Node IP address) 122, and a foreign IP router 124. If a transfer of the communication session from the Transferring Node 106 to the Target Node 120 is desired, the Transferring Node 106 and Target Node 120 will negotiate the transfer and the Transferring Node's end point of the session will be transferred from the Transferring Node 106 to the Target Node 120. Either the Transferring Node 106 or the Target Node 120 may initiate the negotiation.

The Mobile IP network operation of having a Home Agent (HA) intercepting packets sent to a device whose home location is on the HA's subnet and tunneling them to that device when it has relocated on a foreign subnet can be modified to enable the SID mobility network system 100. In order to achieve SID mobility, the underlying Mobile IP concept of re-routing sessions associated with a specific destination device as it moves through a network must be changed such that sessions can be re-routed to different destination devices than the original destination device. Rather than transferring the Transferring Node's base IP address 108, a separate session specific IP address 114 is created with which the Transferring Node 106 will communicate with the Correspondent Node 102. When a Correspondent Node initiates a session with the Transferring Node, the Transferring Node's base address 108 is initially contacted, and a new protocol is used to assign the session specific address 114 to the session instead of the base address 108. When a Transferring Node initiates a session with a Correspondent Node, the Transferring Node will first obtain the session specific address 114 and use it to establish the session. This configuration will allow the Transferring Node 106 to retain its base IP address 108 to establish and participate in additional sessions with other Correspondent Nodes, yet retain the ability to transfer the session with the Correspondent Node 102 by merely transferring the session specific IP address 114 to the Target Node 120.

According to this form, SID mobility is accomplished by moving the session specific IP address 114 through a combination of ARP and Mobile IP from the Transferring Node 106 to a Target Node 120. In order to accomplish this, a protocol must be added to initiate a transferable session and, in order to initiate a communication session, the Correspondent Node 102 must first contact the Transferring Node 106 using its base IP address 108. After receiving notification that the Correspondent Node 102 wishes to conduct a session, the Transferring Node 106 will obtain a session specific IP address 114 from an IP address generator, (e.g., a DHCP server). As a result, the Transferring Node 106 will have two IP addresses, a base IP address 108 for general communication and a session IP address 114 specific to the active Correspondent Node/Transferring Node session.

The Transferring Node 106 must map the session specific IP address 114 to the same network interface as its permanent IP address 108. This mechanism, commonly known as IP-aliasing, will enable all communications destined for the aliased address 114 to be passed up the protocol stack. Once IP aliasing has been accomplished, the Transferring Node 106 will notify the Correspondent Node 102 of the valid session IP address 114 so that the communication session can begin. The actual session is then begun using the session specific IP address 114 instead of the permanent address 108. All communications from the Correspondent Node 102 for that session will use the session specific address 114 to reach the destination (initially the Transferring Node) instead of using the Transferring Node's permanent address 108.

When a session transfer is desired, the Transferring Node 106 negotiates with the Target Node 120 to transfer the session specific IP address 114 to the Target Node 120. Either the Transferring Node 106 or the Target Node 120 may initiate the negotiation. When the Transferring Node and the Target Node are on different subnets, the Target Node 120 will register the session address with the Transferring Node's Agent 110. For security reasons, the Transferring Node 106 and the Target Node 120 will negotiate a session key and convey this information to the Agent 110. This key is used by the Agent 110 to authenticate the registration messages it receives from the Target Node 120. The Transferring Node 106 must also convey any additional information needed to maintain the session address to the Target Node 120 and/or the Agent 110, (e.g., any information needed to keep the session specific IP address checked out). For example, if a DHCP server is being used, the server must receive which either the Agent 110 or the Transferring Node 106 may send.

After a session IP address 114 has been transferred, the session specific traffic will be intercepted by the Agent 110 and tunneled to the Target Node 120. The Target Node 120 must then properly decapsulate (or de-tunnel) the packets to remove the outer header used to tunnel packets to the Target Node 120 so that the original packet can be received. Once this step is complete, the packet is passed up the protocol stack of the Target Node. With such a configuration, the Transferring Node 106 is able to retain a base IP address thereby allowing it to participate in other sessions. The return traffic for the transferred session can be sent directly from the Target Node 106 to the Correspondent Node 102 using the session IP address 114 as the source address in the packet header. Alternately, the return traffic could be reverse tunneled to the Agent 110 for transmission from the Agent 110 to the Correspondent Node 102 using the session IP address 114 as the source address in the packet header. If the Transferring Node is involved in more than one session, (e.g., an additional session with the same, or an additional, Correspondent Node), the return traffic from the Transferring Node 106 pertaining to the additional session can be sent directly to the additional Correspondent Node by using the session IP address which was obtained for the additional session as the source address in the packet header.

Once the session has ended, the Target Node 120 should de-register with the Agent 110. Similarly, in order to transfer the session back to a node on the Transferring Node's subnet, the Target Node 120 must notify the new target and de-register with the Agent 110. To transfer the session to another node not on the Transferring Node's subnet, (if such permission has been granted), the Target Node 120 must notify the new Target Node and the new Target Node must register the new session address location with the Agent 110. Once the session terminates, the last Target Node should release the session IP address 114. In the case of DHCP server, the session IP address 114 will be released back to the DHCP server for future use. If the last Target Node is not on the Transferring Node's subnet, then it must also de-register the session address 114 with the Agent 110.

Referring now to FIG. 2*b*, in which the Transferring Node 106' and the Target Node 120' are on the same subnet, the Target Node 120' can simply intercept the session traffic using a Proxy ARP message that binds the Target Node's link-layer address to the session IP address 114'. The Transferring Node 106' will cease to ARP for the session specific address 114' and the Target Node 120' will begin using ARP to look for the session specific IP address 114' instead. The session can also be passed on to other nodes on the Transferring Node's subnet in the same way or to nodes that are not on the Transferring Node's subnet using the method described above with respect to session specific transfers between nodes located on different subnets (if such permission has been granted). Again, once the session terminates, the last Target Node should release the session IP address 114'. If a DHCP server is being used, the Target Node 120' will release the session specific IP address 114' back to the DHCP server for future use.

Those skilled in the art will readily realize that additional transfers of a given session are possible. After the initial transfer, using the same techniques the session could be returned to the original Transferring Node or instead transferred to another Target Node. Once the session terminates, the last Target Node should release the session IP address 114. In the case of DHCP server, the session IP address 114 will be released back to the DHCP server for future use. If the last Target Node is not on the original Transferring Node's subnet, then it must also de-register the session address 114 with the Agent 110.

According to this form, the session transfer will remain transparent to the Correspondent Node because the session packets will be sent to the session IP address (regardless of whether that address is located at the Transferring Node or the Target Node). Thus, all "flows" in a session will transfer along with the session specific IP address, and all "ports" associated with the session specific IP address will move with that address. Therefore, many flows can be part of the mobile session. For example, a videoconference session may include numerous video, audio, and data flows associated with a session that would all be transferred together when the session moves from the Transferring Node to the Target Node.

Another method and apparatus for enabling SID mobility attempts to conserve IP addresses by only requiring a device to maintain at most two IP addresses. In order to achieve SID mobility by this method, two underlying Mobile IP Home Agent functions must be enhanced. First, referring to FIG. 1*c*, the concept of only transferring the communications to the actual mobile device 12 located on the foreign subnet 16 must be changed so that the receiving device on the foreign subnet can in fact be different than the device to which the packets were originally addressed. Second, the Mobile IP concept of non-selectively forwarding all sessions associated with a given device to its new location must be enhanced to sort and forward on a per-session basis using the IP flow identifying 5-tuples as means to identify sessions.

Figure 3A:
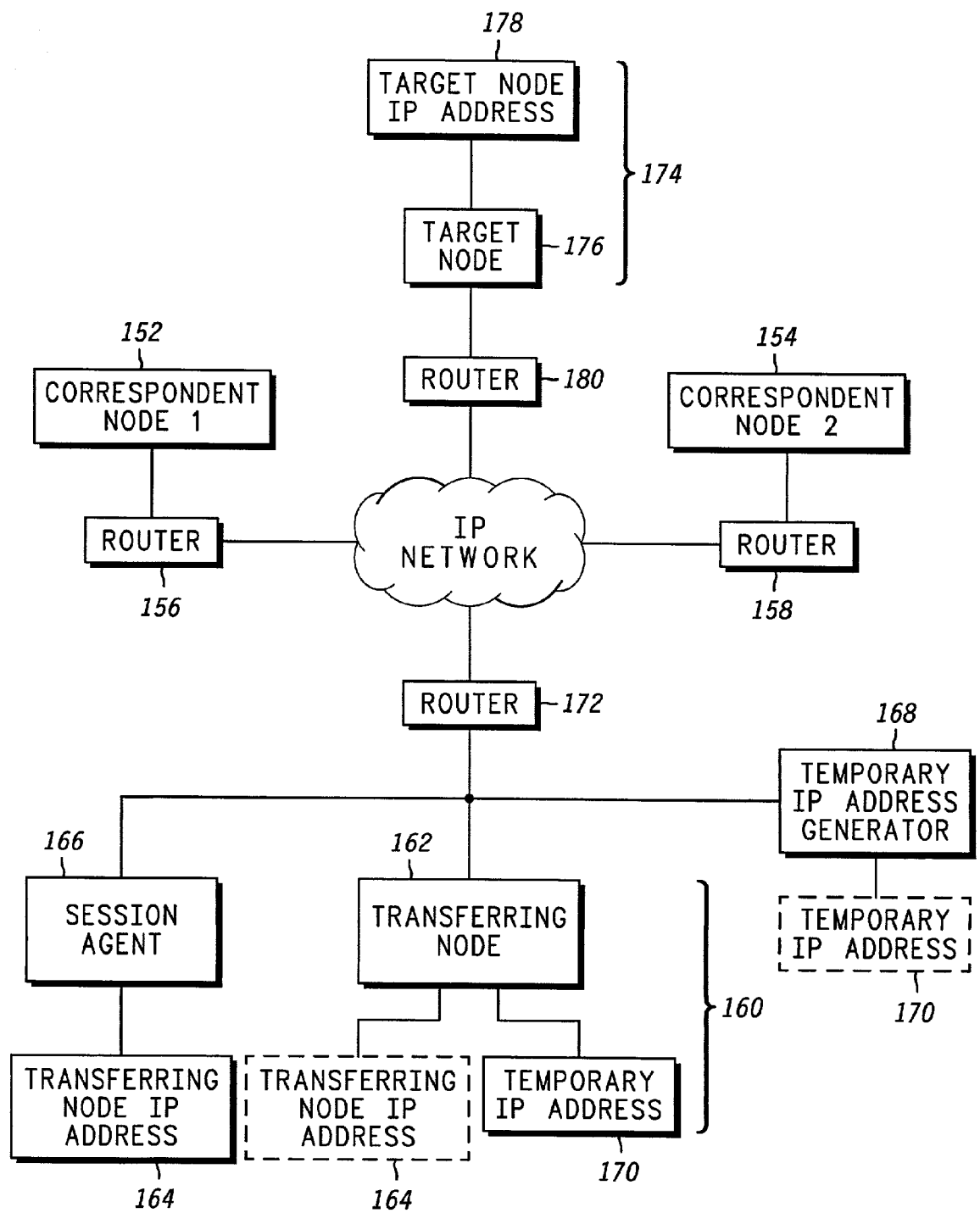
FIG. 3a is a block diagram of an IP based network system showing a communication session between a source device and a first destination device that can be transferred to a second destination device on a different sub-network whereby selected sessions associated with an IP address of the first destination device are transferred to the second destination device.
Figure 3B:
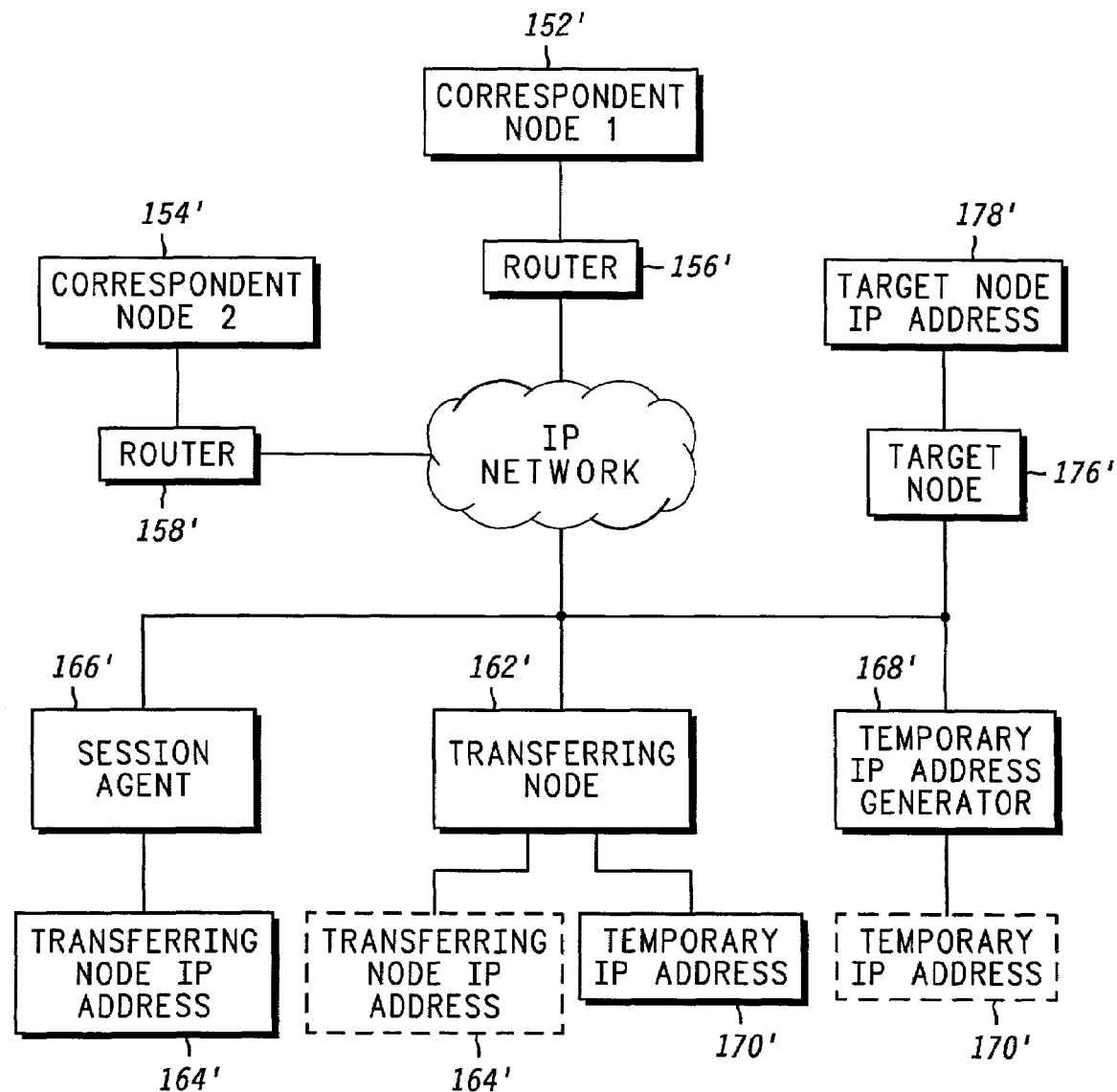
FIG. 3b is a block diagram of the network system from FIG. 3a wherein both the first and second devices are on the same sub-network.

Referring to FIG. 3*a*, a SID mobility IP network system and method are shown generally designated with reference numeral 150. In this embodiment, the network 150 is comprised of a first Correspondent Node 152 and a second Correspondent Node 154, IP routers 156 and 158, a home subnet 160 comprising a Transferring Node 162 having a Transferring Node IP address 164, a Session Agent (SA) 166, a temporary IP address generator 168 (e.g. a DHCP server, etc.) capable of generating a temporary IP address 170, a home IP router 172, a foreign subnet 174 comprising a Target Node 176 having a Target Node IP address 178, and a foreign IP router 180.

SID mobility IP network system 150 allows the diverting of IP traffic from a Transferring Node 162 to a Target Node 176. This enables the network user to transfer all active sessions from one device to another device with minimal interruption, enabling part of SID mobility. In one sense, this functionality can be viewed as legitimizing the Mobile IP denial-of-service attack described above. However, only a Target Node 176 that is trusted by the Transferring Node 162 can receive traffic diverted by the SA 166. As such, if the Target Node 176 were not trusted, then the SA 166 would not forward the session to it. In order to establish this trust, a new method is required for establishing a security association between the Target Node 176 and the SA 166.

To ensure the security of the network 150, the security association between the Transferring Node 162 and the Target Node 176 must be time limited to the duration of the forwarded session(s) so that the Target Node 176 cannot re-register with the SA 166 at some later time to transfer the Transferring Node's future sessions without permission (a form of replay attack). Also, there must be some means of terminating the session transfer when the session has ended, or when the Transferring Node 162 wants to cancel the session transfer. As will be discussed in further detail below, a method is provided for enabling SID mobility which incorporates leveraging Mobile IP functionally, establishing a per session security association between the SA 166 and the Target Node 176, and enabling termination of the session transfer.

According to the network 150 of FIG. 3*a*, a session is initiated between a Correspondent Node 154 and the Transferring Node 162 using the normal IP suite of operations. When the Transferring Node 162 determines that it would like to transfer the session, it negotiates the session transfer with the Target Node 176. In general, either the Transferring Node 162 or the Target Node 176 may initiate the negotiation. During the negotiation, a session key should be established that will form the basis of a temporary security association between the Target Node 176 and the SA 166. For example, a random number is selected by one of the nodes (176 or 162) to serve as a session key and is sent to the other node (162 or 176, respectively) in encrypted form using an existing Transferring Node 162/Target Node 176 security association. The security association is required to encrypt the session key and may be accomplished by using a Transferring Node 162/Target Node 176 shared secret key, if one exists, or by using a public key encryption. If there is no shared secret key and neither device knows the other's public key, then one device can first learn the other's public key from a trusted third party such as a certificate authority. The learning of the public key would only have to be done once, (e.g., before the first time that the Transferring Node 162 transfers a session to the Target Node 176) in order for these devices to exchange sessions between one another. In practice, it will often be the case that the Transferring Node 162 and Target Node 176 are either owned by the same user or under control of the same administration authority, in which case a Transferring Node 162/Target Node 176 security association may be readily available.

The Transferring Node 162 will also inform the Target Node 176 of the SA's IP address, and whether the Target Node 176 has permission to use the services of the SA 166 to further transfer the session to another device. The Transferring Node 162 then obtains a temporary IP address 170 from the temporary IP address generator 168. Next, the Transferring Node 164 will notify the SA 166 that the session is being transferred to the Target Node 176. This notification will contain the Transferring Node's IP address 164 and Temporary IP address(es) 170, the Target Node's IP address 178, the session key encrypted using a Transferring Node 162/SA 166 security association based on a shared secret key or public key encryption, (similar to that described above), a list of flows (5-tuples) defining the session(s) to be transferred, and a flag indicating whether further transferring, (e.g. from the Target Node 176 to another device), is permitted. The SA 166 authenticates that the Transferring Node 162 is the source of this notification using the Transferring Node 162/SA 166 security association.

At this point, the Transferring Node 162 stops looking for packets sent to its IP address 164 on its subnet, (e.g., stops seeking sessions directed to its IP address via Address Resolution Protocol or ARP), and the SA 166 begins sending out requests for the Transferring Node's IP address 164, using ARP for example, on its subnet. The SA 166 sets up a session binding and begins intercepting packets for flows and sessions sent to the Transferring Node's IP address 164. The SA 166 sorts the packets by 5-tuple according to a list of transferred flows (each identified by a 5-tuple). Using encapsulation methods well known in the art, the SA tunnels flows that have been transferred to the Target Node 164 to the Target Node's IP address 178. The SA also employs well-known techniques to tunnel flows that have not been transferred, for example sessions between another Correspondent Node 152 and the Transferring Node 162 or non-transferred sessions between the original Correspondent Node 154 and the Transferring Node 162, to the Transferring Node 162 using the Transferring Node's temporary IP address 170. Thus, only sessions selected for transfer are sent to the Target Node 178 while other sessions to the Transferring Node 162 proceed with minimal disruption. The session key is then used for all SA 166/Target Node 176 security needs associated with the session transfer, (e.g., for authenticating successive registration requests, etc.). This session transfer is accomplished without interrupting the session or otherwise affecting any Correspondent Nodes 152 or 154.

For the case where the Transferring Node 162 already has at least one other session registered with SA 166, the process of registering a new session to be transferred becomes simplified. For example, the SA 166 has already assumed the Transferring Node's IP address 164 and the Transferring Node 162 already has established a temporary address 170. Therefore, after negotiating with the session's accepting device (or new Target Node), the Transferring Node 162 simply registers the session with the SA 166 by providing the 5-tuples of all flows which comprise the session and the new Target Node's IP address.

When the Correspondent Node 154/Transferring Node 162 session has ended, the Target Node 176 terminates the session transfer by sending a registration request to SA 166 with a lifetime field set to 0, thereby causing the transferred session binding (or transfer agreement) to expire. Alternatively, the Target Node 176 may simply stop sending registration requests to the SA 166 and let the binding expire since all SA registrations have a finite lifetime subject to a maximum configured in the SA 166.

Once SA 166 has the Transferring Node 162's IP address 164, it retains the address until all session transfers are either terminated or transferred back to the original Transferring Node 162. In other words, all session transfer bindings have expired. At this point, the SA 166 sends a wake-up message to the Transferring Node 162 using the Transferring Node's temporary IP address 170 and stops intercepting communications addressed to the Transferring Node's IP address 164. (In other words, the SA 166 stops using ARP to associate its physical address with the Transferring Node's IP address 164.) After receiving the wake-up message, the Transferring Node 162 begins looking for communications addressed to its IP address 164 (by using ARP to associate its physical address with the Transferring Node's IP address 164), and resumes its normal role in the network. At this point, the Transferring Node 162 can also return its temporary IP address 170 to the Temporary IP Address Generator 168. Unfortunately, this termination scheme is subject to a potential problem. The Target Node 178 may maliciously continue to send registration requests to the SA 166 extending the lifetime of the binding thereby continuing to receive all traffic for the transferred session and perhaps also for new sessions with the same 5-tuple information. Note however, it is unlikely that such an abuse will occur given that the Transferring Node 162 must have a high level of trust in the Target Node 176 prior to even allowing the transfer to take place. Therefore, it would seem that the chances of the Target Node 176 abusing this trust unlikely if the Transferring Node 162 has transferred the session to the Target Node 176.

To alleviate this problem, a new message is defined whereby the Transferring Node 162 may demand that the SA 166 stop the session transfer. Upon receiving this message, the SA 166 will stop intercepting the communications addressed to the Transferring Node's IP address 164 and will stop tunneling packets to the Target Node 176. The Transferring Node 162 may send this message at any time for a variety of reasons, including: (1) when the Transferring Node 162 suspects that the session has ended but that the Target Node 176 is not letting the SA 166/Target Node 176 binding expire; (2) when the Transferring Node 162 wishes to override the session transfer and resume connectivity regardless of whether the session has ended; and (3) when the Transferring Node 162 might have been off-line when the wake-up message was sent from SA 166.

Returning traffic from the transferred session can be sent directly from the Target Node 176 to the Correspondent Node 154 using the Transferring Node's IP address 164 as the source address in the packet header. This approach will not function properly if routers along the Target Node 176 to Correspondent Node 154 path (router 180, for example) use a process known in the art as ingress filtering to reject packets with a topologically inconsistent source IP address. Alternately, the returning traffic could be reverse tunneled to the SA 166 for transmission from the SA 166 to the Correspondent Node 154. Again, this is done using the Transferring Node's IP address 164 as the source address in the packet header. These issues of handling the reverse path from Target Node 176 to Correspondent Node 154 are analogous to issues for Mobile IP (see FIG. 1c) when the Mobile Node 12 visits a foreign network 16 and requires a path from the foreign network 16 to the Correspondent Node 20. Thus, the reverse path issues and solutions are well known and discussed in the art, especially in Mobile IP references already given.

Once the session has been transferred to the Target Node 176, it may be possible for the Target Node 176 to further transfer the session to another device, (e.g., a second Target Node not shown in FIG. 3a) using the services of the SA 166. This type of transfer can occur if the Transferring Node 162 has granted permission for the Target Node 176 to do so. The granting of permission may be determined by looking to see if a flag has been set or enabled during the negotiation process between the Transferring Node 162 and the Target Node 162 that takes place in preparation for the transfer. If the Target Node 176 has been given the authority to transfer the session via the SA 166, the transfer will be accomplished in an similar fashion to the initial transfer from the Transferring Node 162 to the Target Node 176, (e.g., the Target Node 176 negotiates with the second Target Node not shown, including the selection of a new session key for this transfer and negotiating whether further transfer permission is granted to the second Target Node, and the Target Node 176 communicates the necessary information to SA 166, etc.). When this session is ended SA 166/second Target Node binding expires, and the SA 166 sends a wake-up message to Transferring Node 162.

Thus far, the discussion has focused on the case where one device transfers a session to another device located on a different subnet. The techniques used for this embodiment are fully general and would apply to the case where the Transferring Node and the Target Node are on the same subnet as discussed in the previous embodiments and shown in FIG. 3b. However, those skilled in the art will readily realize that more efficient though less general techniques for communication between the Target Node, Transferring Node and Session Agent would be available in the same subnet case.

In summary, this embodiment of the invention includes a network which uses a "Session Agent" to enable SID mobility. Using a SA 166, Transferring Node 162 can transfer one or more sessions. The SA 166 then intercepts all packets for the Transferring Node 162 and transfers them for the transferred sessions to the appropriate Target Nodes while delivering all packets for non-transferred sessions to the Transferring Node 162. This method enables the transfer of multiple sessions. In addition, the SID Mobility network system 150 uses IP addresses very efficiently so that an extra (or temporary) IP address is only used when a decision to transfer a session from the Transferring Node to a Target Node has been made. With such a configuration, this network system 150 may even be used on network systems where the IP addresses are scarce or expensive.

Thus, it is apparent that there has been provided, in accordance with the invention, methods and apparatuses for transferring a communication session that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations that fall within the spirit and broad scope of the appended claims. For example, the Agent or SA functionality could be integrated with either a Transferring Node or a router on the home subnet, or the functionality of the address generation box (e.g., DHCP) could be integrated into one of the other boxes of the block diagram.

What is claimed is:

1. A method of seamlessly transferring an ongoing communication session between a first device and a correspondent device on an IP network from the first device to a second device, the method comprising:

initiating a communication session between the first device and the correspondent device, the first device using a session specific IP address as the first device IP address, and being configured to allow a user to receive or send the communication session therefrom, whereby the correspondent device is configured to communicate with the first device during the communication session;

negotiating to transfer the communication session from the first device to the second device, the second device being configured to allow a user to receive or send the communication session therefrom; and transferring the first device IP address from the first device to the second device so that communication session data transferred from the correspondent device to the first device via the address thereof will be received by the second device, wherein the step of transferring of the first device IP address comprises: transferring the session specific IP address from the first device to the second device so that data transferred from the correspondent device to the first device via the session specific address will be received by the second device.

2. A method according to claim 1, wherein the negotiating to transfer the session comprises: creating a method for securely transferring the communication session from the first device to the second device.

3. A method according to claim 2, where the created method for securely transferring the communication session comprises: generating a random number to serve as a session key for the secure transfer of the communication session between the first device and the second device.

4. A method according to claim 2, wherein the method further comprises:

encrypting the session key; transferring the encrypted session key from one of said first device and second device to the other of said first device and second device; and using the session key to securely transfer the communication session between the first device and the second device.

5. A method according to claim 1, wherein the method further comprises: generating a wake-up message once the communication session is no longer to be transferred causing the first device to resume receiving communication sessions addressed to its IP address.

6. A method according to claim 1, wherein the first device and the second device are located on different subnets and the method further comprises:

notifying an Agent of the desire to transfer so that the Agent can intercept the sessions addressed to the first device IP address;

intercepting the sessions addressed to the first device at the first device IP address via the Agent; and tunneling the session from the first device to the second device once the first device IP address has been transferred to the second device.

7. A method according to claim 6, wherein the method further comprises: authenticating the notice from the first device to the Agent to ensure that the first device is the source of the notice.

8. A method according to claim 6, wherein the method further comprises: notifying the Agent whether the second device is authorized to transfer the session.

9. A method of seamlessly transferring an ongoing communication session between a first device and a correspondent device on an IP network from the first device to a second device, the method comprising:

requesting the initiation of a communication session between the correspondent device and the first device, the first device being configured to allow a user to receive or send the communication session therefrom, whereby the correspondent device is configured to communicate with the first device during the communication session;

generating a session specific IP address specifically for initiating the communication session between the correspondent device and the first device;

initiating the communication session between the correspondent device and the first device using the session specific IP address;

registering a desire to transfer the communication session from the first device to a second device, the second device being configured to allow a user to receive or send the communication session therefrom; and transferring the session specific IP address from the first device to the second device so that data transferred from the correspondent device to the first device via the session specific IP address will be received by the second device.

10. A method according to claim 9, wherein the method comprises:

requesting the initiation of a communication session between the correspondent device and the first device via use of a permanent IP address associated with the first device; and allowing the first device to participate in additional communication sessions after the transfer of the communication session from the first device to the second device has occurred via the first device's permanent IP address.

11. A method according to claim 9, wherein the method further comprises: negotiating the transfer between the first device to the second device so that each device is aware of the transfer and authorized to participate in the transfer.

12. A method according to claim 11, wherein the negotiation further comprises: generating a random number to serve as a session key for the secure transfer of the communication session between the first device and the second device so that the communication session can only be transferred between authorized devices.

13. A method according to claim 11, wherein the negotiation further comprises: identifying whether the second device can transfer the communication session on to another device so that the second device cannot improperly transfer the communication session to another device unless such permission has been previously given.

14. A method according to claim 9, wherein the method further comprises: notifying the second device of any information that is needed to maintain use of the session specific IP address so that the session specific IP address will continue to work throughout the communication session transfer.

15. A method according to claim 9, wherein the first device and second device are on the same subnet and the method further comprises: intercepting the session addressed to the first device at the session specific IP address via the second device.

16. A method according to claim 15, wherein the interception of the session comprises: using a Proxy ARP message to bind a link-layer address associated with the second device to the session specific IP address.

17. A method according to claim 9, wherein the first device and second device are on separate subnets and the method further comprises:

registering the session specific IP address with an Agent so that the Agent can intercept the session addressed to the session specific IP address and transfer the session from the first device to the second device;

intercepting the session addressed to the session specific IP address via the Agent; and transferring the session addressed to the session specific IP address from the first device to the second device.

18. A method according to claim 17, wherein the transferring further comprises: tunneling the session addressed to the session specific IP address to the second device so that the second device will receive the session originally addressed to the first device.

19. A method according to claim 9, wherein the method further comprises: releasing the session specific IP address once the session has ended so that the address can be reused for future sessions.

20. A method for transferring an ongoing communication session in an IP network from a first node to a second node via use of an IP address without disrupting the communication session, the method comprising:

initiating a communication session request between a first node and a Correspondent Node using base IP addresses for the nodes, the first node being configured to allow a user to receive or send the communication session therefrom, whereby the Correspondent Node is able to communicate with the first node during the communication session;

generating a communication session specific IP address with which the communication session will be associated;

initiating a communication session between the first node and the Correspondent Node using the session specific IP address;

negotiating a transfer of the session specific IP address from the first node to a second node such that the second node will generally assume communicating with the Correspondent Node, the second node being configured to allow a user to receive or send the communication session therefrom;

generating a Proxy ARP message to bind a link-layer address associated with the second node to the session specific IP address so that the second node can intercept the communications pertaining to the session specific IP address; and intercepting the communications addressed to the session specific IP address via the second node such that the communication session with the Correspondent Node continues without interruption, wherein the step of negotiating a transfer includes: transferring the session specific IP address from the first node to the second node so that data transferred from the Correspondent Node to the first node via the session specific address will be received by the second node.

21. A method of transferring an ongoing communication session between a Transferring Node and a Correspondent Node from the Transferring Node to a Target Node without disrupting the communication session, the method comprising:

initializing a communication session between a Correspondent Node and a Transferring Node by having the Correspondent Node contact the Transferring Node via a permanent IP address assigned to the Transferring Node, the Transferring Node being configured to allow a user to receive or send the communication session therefrom, whereby the Correspondent Node is configured to communicate with the Transferring Node during the communication session;

obtaining a session specific IP address for the initialized communication session;

mapping the session specific IP address to the Transferring Node's permanent IP address;

notifying the Correspondent Node of the session specific IP address for the initialized communication session;

communicating between the Correspondent Node and the Transferring Node via the session specific IP address; and transferring the session specific IP address from the Transferring Node to the Target Node when a session transfer is ready to occur, the Target Node being configured to allow a user to receive or send the communication session therefrom, wherein the step of transferring the session specific IP address includes transferring the session specific IP address from the Transferring Node to the Target Node so that data transferred from the Correspondent Node to the Transferring Node via the session specific address will be received by the Target Node.

22. The method of claim 21, wherein the transfer of the communication session further comprises:

negotiating the session transfer between the Transferring Node and the Target Node;

generating a random number to serve as a session key as a result of the negotiating;

encrypting the session key via a security association between the Transferring Node and an Agent; and transmitting the encrypted session key between the Transferring Node and the Target Node;

notifying the Agent that the communication session is being transferred from the Transferring Node to the Target Node;

authenticating the transfer notification by having the Agent verify that the Transferring Node sent the transfer notification;

intercepting the session communications intended for the Transferring Node via the Agent; and tunneling the session communications intended for the Transferring Node to the Target Node via the Agent.

23. The method of claim 21, wherein the method further comprises: allowing the Transferring Node to participate in another communication session while the transferring a first session to a Target Node.

24. A system for seamlessly transferring an ongoing communication session between different devices on an IP network occurring between a remote information source and one of the devices, the system comprising:

a first device having a first IP address that is used to direct packets intended for receipt by the first device from the remote source over the network to the first device, the first device being configured to allow a user to receive or send the communication session therefrom, whereby the remote source is configured to communicate with the first device during the communication session;

a second device having a second IP address that is used to direct packets intended for receipt by the second device from the remote source over the network to the second device, the second device being configured to allow a user to receive or send the communication session therefrom;

a switch associated with the first device and the second device operable to enable the second device to receive at least certain ones of the packets intended for the first device from the remote information source for seamless session transfer between the device;

an Agent for intercepting the packets directed to the first device at the first IP address and transferring the session to the second device;

an IP address generator for generating a session specific IP address which the remote information source and the first device use to conduct the session of communication; and a session specific IP address generated by the IP address generator, wherein the Agent for intercepting intercepts the packets directed to the first device uses the session specific IP address so that data transferred from the remote source to the first device via the session specific address will be received by the second device.

25. A system for seamlessly transferring an ongoing communication session on an IP network, the system comprising:

a Correspondent Node for transmitting and receiving packets of data within a communication session;

a Transferring Node having a Transferring Node IP address and a session specific IP address, the Transferring Node being capable of participating in the communication session with the Correspondent Node, and being configured to allow a user to receive or send the communication session therefrom;

a Target Node capable of participating in the communication session with the Correspondent Node, and being configured to allow a user to receive or send the communication session therefrom; and an IP network capable of transferring the communication session between the Correspondent Node and the Transferring Node from the Transferring Node to the Target Node by transferring the session specific IP address from the Transferring Node to the Target Node thereby allowing the Transferring Node to continue to participate in communication sessions via its Transferring Node IP address, wherein transferring the session specific IP address from the Transferring Node to the Target Node directs data transferred from the Correspondent Node to the Transferring Node via the session specific address to be received by the Target Node.

26. A system according to claim 25, wherein the system further comprises: an Agent for intercepting the communication session directed to the session specific IP address and transferring the session to the Target Node located on a foreign subnet.

27. A method for transferring an ongoing communication session in an IP network from a first node to a second node via use of an IP address without disrupting the communication session, the method comprising:

initiating a communication session request between a first node and a Correspondent Node using base IP addresses for the nodes, the first node being configured to allow a user to receive or send the communication session therefrom, whereby the Correspondent Node is configured to communicate with the first node during the communication session;

generating a communication session specific IP address with which the communication session will be associated;

initiating a communication session between the first node and the Correspondent Node using the session specific IP address;

negotiating a transfer of the session specific IP address from the first node to a second node such that the second node will generally assume communicating with the Correspondent Node, the second node being configured to allow a user to receive or send the communication session therefrom;

notifying an Agent about the transfer so that the Agent can intercept communications addressed to the session specific IP address and forward the communications to the second node; and intercepting and forwarding the communications addressed to the session specific IP address to the second node such that the communication session with the Correspondent Node continues without interruption, wherein the step of negotiating a transfer includes transferring the session specific IP address from the first node to the Agent so that data transferred from the Correspondent Node to the first node via the session specific address will be received by the second node.

* * * * *